G. C. CHASE AND D. V. MAZZOCCO.
ZERO SETTING MEANS FOR REGISTERS.
APPLICATION FILED JUNE 14, 1918.

1,358,058.

Patented Nov. 9, 1920.
4 SHEETS—SHEET 1.

INVENTORS:
George C. Chase
BY Dante V. Mazzocco
ATTORNEY

G. C. CHASE AND D. V. MAZZOCCO.
ZERO SETTING MEANS FOR REGISTERS.
APPLICATION FILED JUNE 14, 1918.
1,358,058.
Patented Nov. 9, 1920.
4 SHEETS—SHEET 2.
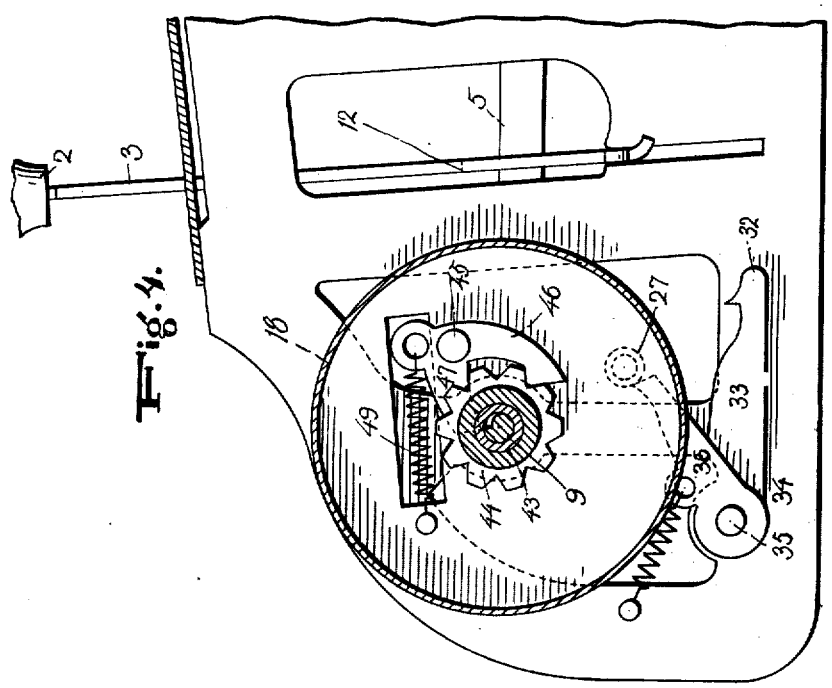
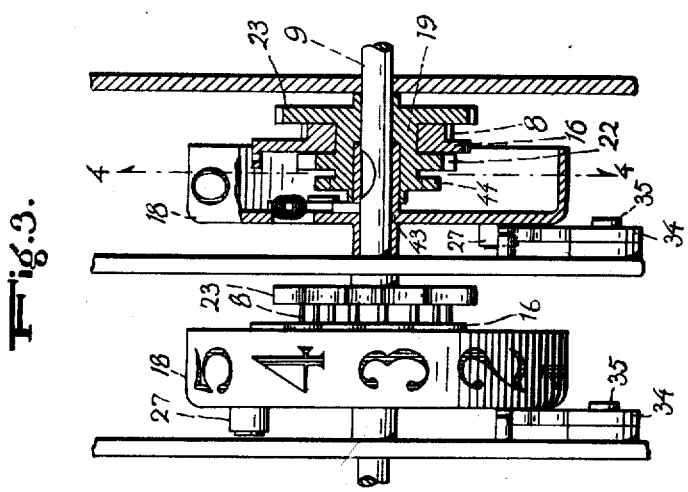
INVENTORS:
George C. Chase,
BY Dante V. Mazzocco,
E.W. Anderson
ATTORNEYS.

G. C. CHASE AND D. V. MAZZOCCO.
ZERO SETTING MEANS FOR REGISTERS.
APPLICATION FILED JUNE 14, 1918.

1,358,058.

Patented Nov. 9, 1920.

INVENTORS:
George C. Chase.
BY Dante V. Mazzocco.
E.W. Anderson
ATTORNEYS

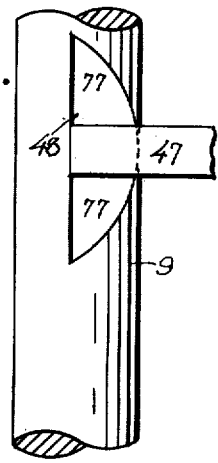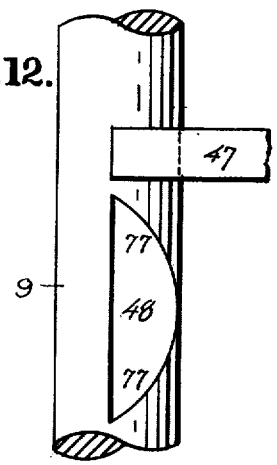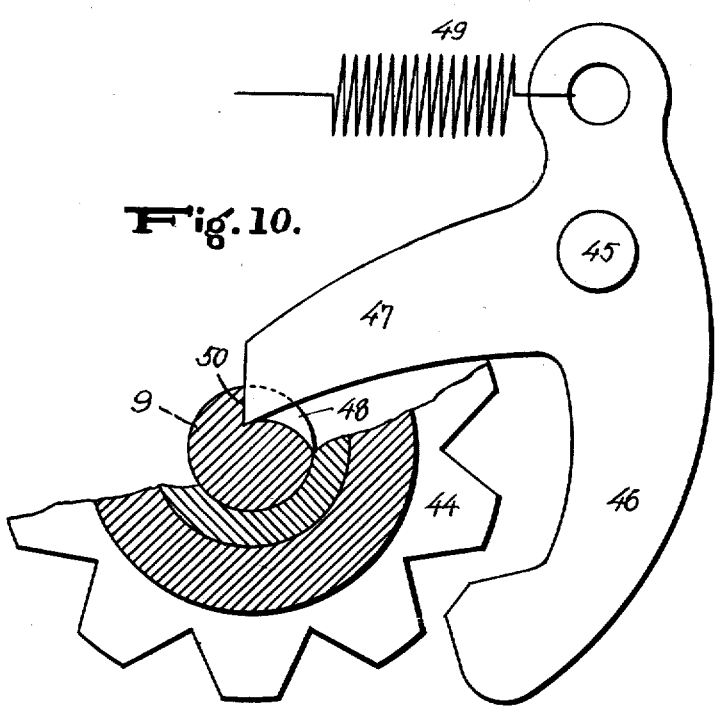

UNITED STATES PATENT OFFICE.

GEORGE C. CHASE AND DANTE V. MAZZOCCO, OF ORANGE, NEW JERSEY, ASSIGNORS TO CHASE ADDING MACHINE CORPORATION, OF ORANGE, NEW JERSEY, A CORPORATION OF DELAWARE.

ZERO-SETTING MEANS FOR REGISTERS.

1,358,058. Specification of Letters Patent. Patented Nov. 9, 1920.

Application filed June 14, 1918. Serial No. 240,054.

*To all whom it may concern:*

Be it known that we, GEORGE C. CHASE, a citizen of the United States of America, resident of Orange, in the county of Essex and State of New Jersey, and DANTE V. MAZZOCCO, a subject of the King of Italy, and having taken out my first U. S. naturalization papers, resident also of Orange, Essex county, New Jersey, have made a certain new and useful Invention in Zero-Setting Means for Registers; and we declare the following to be a full, clear, and exact description of the same, such as will enable others skilled in the art to which it appertains to make and use the invention, reference being had to the accompanying drawings, and to letters or figures of reference marked thereon, which form a part of this specification.

Fig. 3 is a front view of two numeral wheels, with parts in section.

Fig. 4 is a section on the line 4—4, Fig. 3.

Fig. 10 is a side view of the independent clutch interposed in the detaining means, with parts in section, the pawl member of the clutch engaged with the shaft.

Fig. 11 is a plan view of the same, omitting the clutch wheel.

Fig. 12 is a similar view, with the shaft moved endwise to release the pawl member therefrom.

Figure 1:
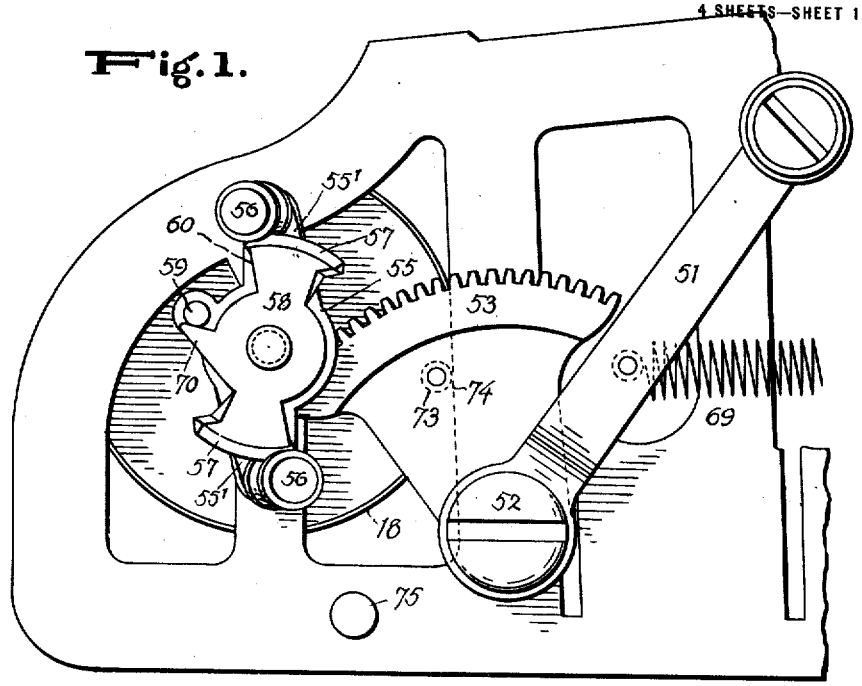
Figure 1 is an end view of the invention.
Figure 2:
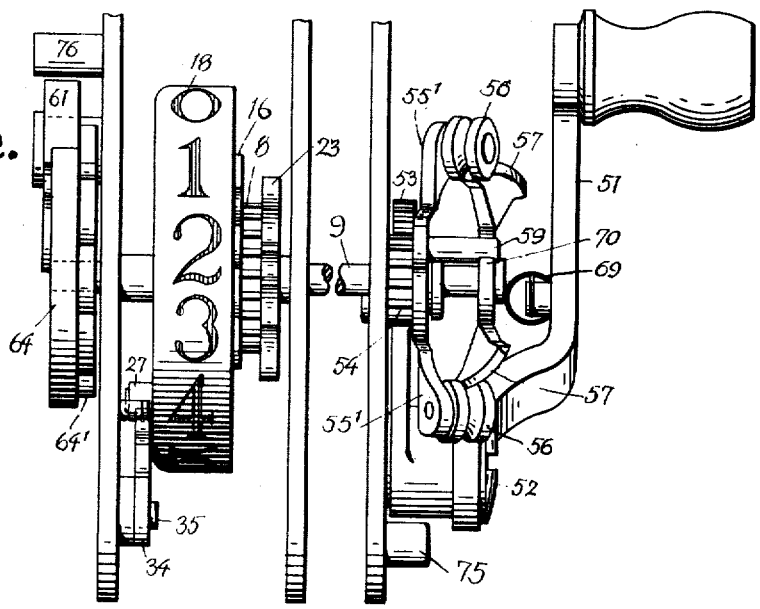
Fig. 2 is a front view of the same, with parts broken away.
Figure 7:
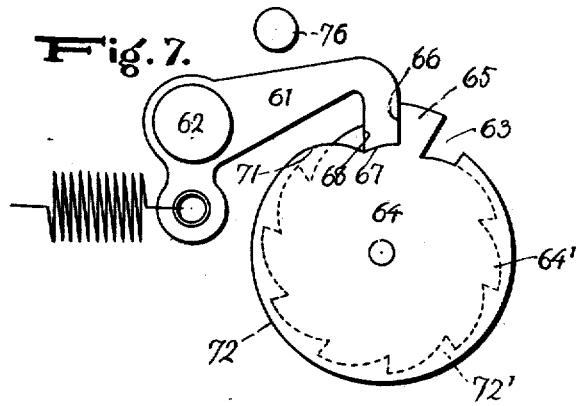
Fig. 7 is a view similar to Fig. 5, with the parts in position taken after the shaft has been moved endwise and rotatively from normal position.
Figure 8:
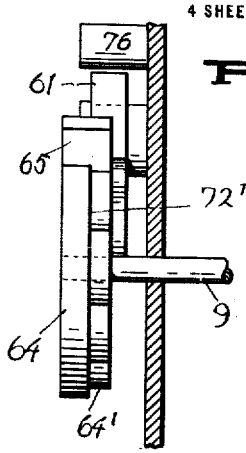
Fig. 8 is an edge view of the same.
Figure 5:
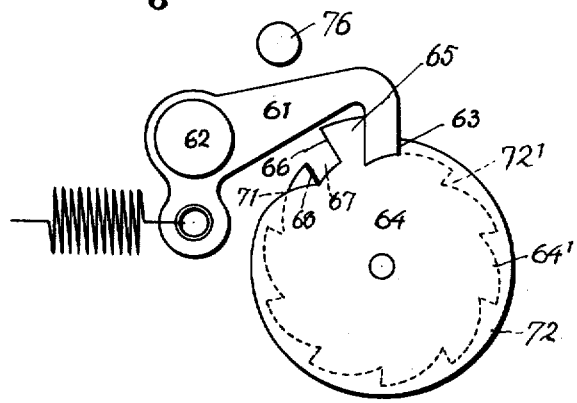
Fig. 5 is a side view of the return disk, its ratchet wheel and the control pawl, these parts being in normal position.
Figure 6:
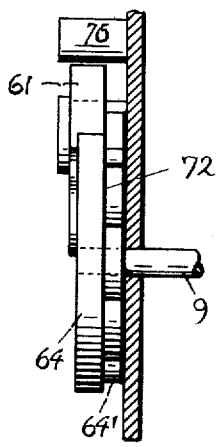
Fig. 6 is an edge view of the same.
Figure 9:
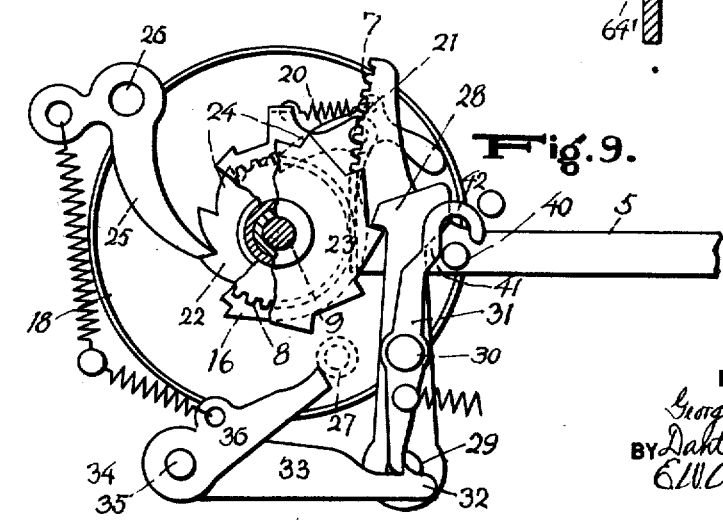
Fig. 9 is a side view of a numeral wheel and the registering mechanism associated immediately therewith.

The invention has relation to clearing mechanism or means for rotating or resetting the numeral wheels of adding machines and registers to zero position, and it consists in the novel construction and combinations of parts, as hereinafter set forth.

In the zeroizing operation it is desirable that any wheels, pawls or other gear elements that may normally engage the numeral wheels or gears of said wheels, shall not have their engagement disturbed, and a principal object of the present invention is to avoid any such disturbance, the invention being applicable, for instance to a machine as shown in the pending application of George C. Chase, Serial Number 202,533. Other objects and advantages will hereinafter appear.

In the accompanying drawings, illustrating the preferred embodiment of the invention, the numeral 2 designates depressible numeral keys, arranged in denominational series and having stems 3. Relating to each series of denominational keys is a depressible lever 5, pivoted in rear, and at its forward end provided with a segment rack 7, engaging a pinion 8 carried by a shaft 9. Each key stem is provided with a shoulder 12, engaging the respective segment lever in the depression of the key and actuating the lever to turn the pinion 8.

Numeral wheels 18 are loosely mounted upon the shaft 9, and means are provided to turn any one of said wheels to the proper extent upon depression of a key of the denominational series relating thereto, said means consisting usually of a sleeve 19, having driving connection as hereinafter set forth with each numeral wheel. The sleeve 19 is loosely mounted upon the shaft 9, and upon it in turn the pinion 8 and its attached wheel 16 are loosely mounted, a spring-pressed pawl 20 being pivoted to the wheel 16 at 21 and engaging the teeth of a ratchet wheel 22, carried by the sleeve 19 at one end thereof, said sleeve at its other end carrying fast thereto a wheel 23, having teeth 24 and termed a lock wheel. Rotation of the pinion 8 will, through the pawl 20 and ratchet 22, rotate the sleeve 19 and the numeral wheel related thereto, backward movement of the wheels being prevented by a spring-pressed pawl 25, engaging the ratchet 22 and pivoted at 26 to a fixed part of the machine or framing.

There is normally sufficient space between the shoulder 12 of the key stem and the upper edge of the corresponding segment lever to permit of one extra step or degree of upward movement of the segment lever.

This extra movement of the segment lever takes place whenever there is carrying to be performed, causing an additional rotation of the numeral wheel for this purpose. In order to provide against the numeral wheels receiving this additional impulse whether or not there should be a carry, and for other purposes, we provide for each numeral wheel a detent 28, pivoted at one end at 29 and at its free end engaging the ten-pointed lock wheel 23. Pivoted to each detent 28 at 30 is a detent lock 31, the lower arm of which is engaged by the hooked end 32 of one arm 33 of a latch 34, pivoted at 35 and having its other arm 36 engaged at its free end by a pin 27 of the next lower numeral wheel whenever that wheel passes from 9 to 0.

In the normal position of these parts the detent engaging the wheel 23 will, in connection with the detent lock and the latch, rigidly lock said wheel against rotation, movement of the detent lock in a direction to release it from the latch being prevented by a lateral stud or projection 40 of the corresponding segment lever, so long as the latch remains engaged with the detent lock 31.

In the extra movement of the segment lever, the stud 40 thereof engages the upper cam surface 41 of the detent and returns the detent into engagement with the lock wheel, the detent lock having a reversely turned or hooked upper end 42, engaged by the stud 40 in this extra movement, to reëngage the detent lock with the latch.

Means are provided to temporarily disconnect the numeral wheel from the wheel 23 forming a part of the locking means for the numeral wheel at the end of the normal rotation thereof, so that the said locking means shall not be disturbed during the rotation of the wheels to zero position, said means consisting of a releasable clutch or coupling device interposed between these parts, and described as follows:

The numeral wheel, mounted upon shaft 9, is formed with a hub portion 43, whereon is rotatably mounted a clutch member or ten-toothed wheel 44, to which the lock wheel 23 and the ratchet wheel 22 are fast or integral, to rotate therewith, the numeral wheel having pivoted thereto at 45 a spring-pressed clutch member or pawl 46, said pawl having normally engagement with any one of the series of notches located between the teeth of the clutch wheel, to rigidly connect the numeral wheel and the lock wheel together, both wheels rotating as one.

Each clutch member or pawl 46 is provided with an arm 47, normally riding upon the circumferential surface of the shaft 9, to maintain the clutch members in engagement, and when it is desired to release the clutch members and set the numeral wheels to zero position, the shaft 9 is moved endwise a short distance, thereby bringing a notch 48 of the shaft into register with the arm of the pawl, so that in the rotation of the shaft said arm will fall into said notch, under the influence of the spring 49 of the pawl, and thereby move the pawl from engagement between the teeth of the clutch wheel, to release the clutch; and the shaft 9 continuing its rotary movement, the shoulder 50 of the notch, acting upon the arm of the pawl, will move the pawl bodily and will rotate therewith the numeral wheel to which the pawl is attached, the clutch wheel and the lock wheel, as also the ratchet wheel, remaining stationary or undisturbed.

In order that the numeral wheels may not, by passing from 9 to 0 during the resetting operation, engage their pins 27 with the arms 36 of the latches, and thereby release the segment levers as in carrying, these wheels are designed to be rotated reversely to zero; and inasmuch as the pins 27 would come in contact with the ends of the arms 36 if it were attempted to rotate these wheels reversely from or past zero position, it is provided that the resetting action shall not include the movement from 0 to 9. To this end the normal or initial position of the shaft 9 is such that upon endwise movement the notches 48 thereof will engage the arms 47 of the pawls 46 of such wheels as stand at 9; and the rotative movement given the shaft is less than a complete rotation thereof, or just sufficient to reset such wheels reversely to zero. During this movement the shaft 9 will catch up such of the numeral wheels as may have been rotated varying degrees in the performance of the problem, and rotate or reset these wheels to zero position.

Means are provided to move the shaft 9 endwise; thereafter to rotate the shaft for the purpose stated, and finally to return the shaft endwise to normal position, said means described as follows:

The zero-setting handle 51 is pivoted at one end at 52, and has secured thereto a segment gear 53, said gear engaging a pinion 54, rotatably mounted upon a bushing concentric with the shaft 9 and carrying fast thereto a yoke 55, having oppositely extending radial arms 55', each of said arms at the free end thereof provided with a grooved roller 56, the rollers engaging oppositely extending radial cam arms 57 of a helical cam 58, fast to said shaft, each cam arm subtending an angle of about 45 degrees.

The zero-setting handle being rotated to any convenient extent, shown as about one-quarter turn, the gear ratio of the segment gear and pinion is such that the pinion will be rotated somewhat more than a complete turn. In the first partial turn of the pinion the yoke will be rotated therewith, through the medium of the rollers and helical cam, to move the shaft 9 endwise to the proper extent, a lateral pin 59 upon the yoke then coming in contact with a radial edge 60 of one of the cam arms and rotating the helical cam bodily with the yoke and rotating also the shaft 9, during the balance of the rotative movement of the pinion, to thereby release the clutch pawls from the clutch wheels and rotate the number wheels to zero. The handle being moved reversely, the shaft 9 will be returned endwise to normal position, through the medium of the helical cam and rollers aforesaid.

In the operation of the rollers upon the helical cam to move the shaft 9 endwise in an outward direction, the cam is held from rotation, as is also the shaft, by means of a spring-pressed control pawl 61, pivoted at 62 to the framing and engaging a circumferential notch 63 of a return disk 64, said disk having fast thereto at one side a concentric ratchet wheel 64', and both return disk and ratchet wheel made fast to the shaft at one end thereof. A radial projection 65 is common to return disk and ratchet wheel, and one side wall thereof constitutes one side wall of said notch. The shaft 9 being then moved endwise as stated, the return disk and ratchet wheel will be moved therewith and the return disk will be slid from engagement with the pawl, said wheel at the same time moving into engagement with the pawl, so that the wall of the notch opposite the projection 65 being no longer in alinement with the pawl, the shaft and the cam may be rotated freely in one direction, or reversely, the pawl slipping over the teeth of the ratchet in this direction of movement. The return disk is of greater diameter than the ratchet, so that, while the teeth of the ratchet will engage the pawl to prevent movement of the shaft and cam in an opposite or forward direction, the projecting circumferential lateral wall 72' will engage said pawl to prevent return endwise movement of the shaft and cam, under the influence of the return spring 69. The latter movement, if allowed, would free the pawl from the ratchet and permit the shaft to be returned to normal position before the completion of the resetting operation.

The shaft being rotated reversely to a sufficient extent, this pawl will abut against the opposite side wall 66 of said projection, the shaft 9 and the helical cam being thereby arrested against further movement rotatively in this direction. In this position of the parts the pawl engages a peripheral notch 67, one side wall of said notch being the face or edge 66 of the projection 65 and the other side wall of the notch being a shoulder 68 of one of the teeth of the ratchet wheel, the engagement of this pawl with said shoulder serving to prevent rotative movement of the shaft 9 and the helical cam during the endwise return movement thereof.

The zero-setting handle being now released, and returned to normal position by its spring 69, the shaft 9 will be returned endwise to normal position by the action of the rollers of the yoke upon the helical cam, the return movement of the shaft restoring the engagement of the clutch pawl and clutch wheel aforesaid, to again lock the numeral wheels against movement in either direction, the pawl arm riding outwardly upon the bottom wall of the shaft notch, said bottom wall having inclined ends 77. The return disk and ratchet wheel moving endwise with the shaft, at the end of the endwise movement the pawl will be released from the shoulder 68 of the ratchet tooth, forming one wall of the aforesaid notch, and reëngaged with the return disk. The yoke, at the end of its rotative movement to return the shaft endwise to normal position, will, through its lateral pin 59, contact with a radial projection 70 of the aforesaid cam, and, the handle and yoke continuing to turn, the helical cam and the shaft 9 will now move bodily with the yoke, and the return disk moving with the shaft, the pawl will ride outwardly upon the cam surface 71 of the return disk and upon the peripheral surface 72 of said disk until the rotative return movement is completed, when the pawl will drop into the notch 63 and restore the lock of the shaft and the cam against rotation.

The lateral stud or projection 27 of each numeral wheel 18 will, at the end of the rotative movement of the numeral wheel to zero position, come in contact with the end of the arm 36 of the latch, this engagement, as stated, preventing further reverse movement of the numeral wheel past zero position, but as it is not desirable to load the latch arms with the strain of arresting the numeral wheels and the train of mechanism back to the zero-setting handle, the radial projection 65 of the return disk and ratchet wheel has engagement with the control pawl for this purpose.

The segment gear 53 is provided with a lateral pin 73 having stop engagement with the framing at 74, and one edge of said gear has stop engagement with a pin 75 of the framing, to limit the movement of the gear in both directions, the first-named engagement serving to relieve the numeral wheel shaft 9 from the direct shock of stoppage of the handle and gear when moved forwardly, and the last-named engagement serving to arrest the handle, the segment gear, the shaft 9 and the helical cam at normal position.

The control pawl is limited in its outward movement by a stop pin 76 of the framing.

We claim:

1. In a register, a progressively advanced member, a numeral wheel normally fast upon and having a clutch connection with said member, and means for releasing the clutch and resetting the released wheel to zero.

2. In a register, a progressively advanced member, a numeral wheel normally fast upon and having clutch connection with said member, and means for releasing the clutch and rotating the released wheel reversely to zero.

3. In a register, a progressively advanced member, detaining means therefor, a numeral wheel normally fast upon and having a clutch connection with said member, and means for releasing the clutch and resetting the wheel to zero independently of said detained member.

4. In a register, a gear member, an actuator having a pawl and ratchet driving connection with said member, a numeral wheel normally fast upon and having a clutch connection with said member, and means for releasing the clutch and rotating the released wheel reversely to zero.

5. In a register, a numeral wheel, a pawl carried thereby, detaining means having a normally established clutch connection with said wheel through the medium of said pawl, and means for releasing the clutch and resetting the released wheel to zero.

6. In a register, a numeral wheel, an actuator therefor, a pawl carried by said wheel, detaining means including a gear element engaged by said pawl and having thereby a normally established clutch connection with said wheel, said detaining means having a ratchet and pawl connection with said actuator, and means for releasing the clutch and resetting the released wheel to zero.

7. In a register, a shaft, a numeral wheel thereon, detaining means for said wheel, an independent clutch interposed in the detaining means, and means for moving the shaft endwise to release the clutch and for thereafter resetting the wheel to zero.

8. In a register, a shaft, a numeral wheel thereon, detaining means for said wheel, an independent clutch interposed in the detaining means, and means for moving the shaft endwise and rotatably to release the clutch and reset the wheel to zero.

9. In a register, a shaft, a numeral wheel thereon, detaining means for said wheel, an independent clutch interposed in the detaining means, means for moving the shaft endwise to release the clutch and for thereafter resetting the wheel to zero, and means for locking the shaft against rotation during its endwise movement.

10. In a register, a shaft, a numeral wheel thereon, detaining means for said wheel, a clutch interposed in the detaining means, means for moving the shaft endwise and rotatably to release the clutch and to reset the wheel to zero, and means for locking the shaft against endwise movement during its resetting rotation.

11. In a register, a shaft, a numeral wheel thereon, detaining means for said wheel, a clutch interposed in the detaining means, means for moving the shaft endwise and rotatably to release the clutch and to reset the wheel to zero, and means for locking the shaft against reverse rotation during its resetting rotation.

12. In a register, a shaft, a numeral wheel thereon, detaining means for said wheel, and means including an operating member rotatable to first move the shaft endwise to release the detaining means and thereafter to reset the wheel to zero.

13. In a register, a shaft, a numeral wheel thereon, detaining means for said wheel, means operable upon endwise and rotary movement of said shaft to release said detaining means and to reset said wheel to zero, and means for preventing reverse rotary and endwise movement of said shaft during the resetting operation.

14. In a register, a shaft, a numeral wheel thereon, detaining means for said wheel, and means including an operating member rotatable to move the shaft endwise and rotatably to release the detaining means and reset the wheel to zero, said means operable to move the shaft reversely endwise and rotatably.

15. In a register, a shaft, a numeral wheel thereon, detaining means for said wheel, and means including a helical cam and an operating member engaging the cam and rotatable to first move the shaft endwise to release the detaining means and thereafter to reset the wheel to zero.

16. In a register, a shaft, having a shoulder, a progressively advanced numeral wheel thereon, an element upon said wheel adapted to engage said shoulder, and means for engaging said element with said shoulder and rotating the shaft to reset the wheel backwardly to zero.

17. In a register, a shaft having a shoulder, a numeral wheel thereon, detaining means for said wheel, an independent clutch interposed in the detaining means including an element adapted to engage said shoulder, and means for releasing the clutch, engaging said element with said shoulder and rotating the shaft to reset the wheel backwardly to zero.

18. In a register, a shaft, a numeral wheel thereon, detaining means for said wheel, means for moving the shaft endwise to release the detaining means and for rotating the shaft to reset the wheel to zero, and an independent stop for the shaft at the end of its resetting rotation.

19. In a register, a shaft, a numeral wheel thereon, detaining means for said wheel, means for moving the shaft endwise to release the detaining means and for rotating the shaft to reset the wheel to zero, said means having a spring connection and operable to automatically move the shaft reversely endwise and rotatably.

20. In a register, a numeral wheel, detaining means having a normally established clutch connection with said wheel, a resetting member adapted for connection with said wheel through clutch means normally disengaged, and means for respectively releasing and engaging the clutches and operating said member to reset the wheel to zero.

21. In a register, a numeral wheel, a pawl carried thereby and having an extension, detaining means having a normally established clutch connection with said wheel through the medium of said pawl, a resetting member adapted for clutch connection with said wheel through said extension and said pawl, and means for respectively releasing and engaging the clutches and operating said member to reset the wheel.

22. In a register, a numeral wheel, a spring pawl upon said wheel and having an extension, detaining means having a normally established clutch connection with said wheel through the medium of said pawl, a resetting member adapted for clutch connection with said wheel through said extension and said pawl, and means for respectively releasing and engaging the clutches and operating said member to reset the wheel.

23. In a register, a shaft, a numeral wheel thereon, an actuator including a gear element having a normally established rigid clutch connection with said wheel, said shaft adapted for connection with said wheel through clutch means normally disengaged, and means for releasing the clutch between the wheel and the gear element, establishing the clutch between the wheel and the shaft and thereafter resetting the wheel to zero.

24. In a register, a shaft, a numeral wheel thereon, an actuator having a normally established rigid clutch connection with said wheel, said shaft adapted for connection with said wheel through clutch means normally disengaged, and means for moving the shaft endwise and rotatably to respectively release and engage the clutches and to reset the wheel to zero.

25. In a register, a shaft, a numeral wheel thereon, an actuator including a gear element having a normally established clutch connection with said wheel, including a pawl having a rigid arm, said shaft adapted for clutch connection with said wheel through said rigid arm, and means for releasing the clutch between the wheel and the gear element and establishing the clutch between the wheel and the shaft and thereafter for resetting the wheel to zero.

26. In a register, a shaft, a numeral wheel thereon, an actuator including a gear element having a normally established clutch connection with said wheel, including a pawl having a rigid arm, said shaft adapted for clutch connection with said wheel through said rigid arm, and means for moving the shaft endwise and rotatably to respectively release and engage the clutches and reset the wheel to zero.

27. In a register, a shaft, a numeral wheel thereon, an actuator including a gear element having a normally established clutch connection with said wheel, including a pawl having a rigid arm, said shaft adapted for clutch connection with said wheel through said rigid arm, and means for moving the shaft endwise and rotatably to respectively release and engage the clutches and reset the wheel to zero, said means adapted to move the shaft reversely endwise and rotatably to respectively engage and release the clutches and restore the shaft to normal position.

28. In a register, a shaft, a numeral wheel thereon, an actuator including a gear element having a normally established clutch connection with said wheel, said shaft adapted for connection with said wheel through clutch means normally disengaged, means for moving the shaft endwise and rotatably to respectively release and engage the clutches and thereafter reset the wheel to zero, including means for normally and during the endwise shaft movement locking the shaft against rotation and thereafter releasing the shaft and for relocking the shaft against rotation at the end of the zero setting.

29. In a register, a shaft, a numeral wheel thereon, an actuator including a gear element having a normally established clutch connection with said wheel, said shaft adapted for connection with said wheel through clutch means normally disengaged, means for moving the shaft endwise and rotatably in one direction, adapted to release one clutch and engage the other clutch and thereafter to reset the wheel to zero, including means for normally and during the endwise shaft movement locking the shaft against rotation, said means adapted to move the shaft endwise in the opposite direction to reestablish the first-named clutch and release the other clutch and thereafter to rotate the shaft reversely to normal position, the locking means adapted during the reverse endwise shaft movement to lock the shaft against rotation, to release the lock and at the end of the reverse rotation of the shaft to reëngage the lock.

30. In a register, a shaft, numeral wheels thereon, means for rotating said shaft, and means operable upon rotation of said shaft to reset said wheels to zero, said means adapted to avoid resetting of any wheel standing at zero position, and said shaft-rotating means automatically operable to return said shaft to initial position.

31. In a register, a shaft, numerals wheels thereon, transfer means having elements serving incidentally to prevent backward rotation of said wheels from zero position, and means operable upon rotation of said shaft to reset said wheels backwardly to zero.

32. In a register, a shaft, numeral wheels thereon, transfer means having elements serving incidentally to prevent backward rotation of said wheels from zero position, means for limiting rotation of said shaft to an extent corresponding to less than ten numeral places upon said wheels, and means operable upon rotation of said shaft to reset said wheels backwardly to zero.

33. In a register, a shaft, numeral wheels thereon, transfer means having elements serving incidentally to prevent backward rotation of said wheels from zero position, means for rotating said shaft, means for limiting the rotation of said shaft to an extent corresponding to less than ten numeral places upon said wheels, and means operable upon rotation of said shaft to reset said wheels backwardly to zero, said shaft-rotating means adapted to automatically return the shaft to initial position.

34. In an adding machine, numeral wheels, denominational keys, an actuator operable to impart to its respective wheel movement to register key values and movement to register a carry, said actuator including and throughout its movement constantly engaged with its respective wheel through the medium of ratchet and pawl gearing, and means for releasing the engagement between said wheel and said gearing and for resetting the wheel to zero.

35. In an adding machine, numeral wheels, denominational keys, an actuator operable to impart to its respective wheel movement to register key values and movement to register a carry, said actuator including and throughout its movement constantly engaged with its respective wheel through the medium of ratchet and pawl gearing, one member of said gearing having a clutch connection with said wheel, and means for releasing the clutch and resetting the wheel to zero.

36. In an adding machine, a shaft, numeral wheels thereon, denominational keys, an actuator operable to impart to its respective wheel movement to register key values and movement to register a carry, said actuator including and throughout its movement constantly engaged with its respective wheel through the medium of ratchet and pawl gearing, one member of said gearing having a clutch connection with said wheel, said shaft adapted for connection with said wheel through clutch means normally disengaged, and means for releasing the clutch between said member and said wheel and establishing the clutch between the wheel and the shaft, and thereafter resetting the wheel to zero.

37. In an adding machine, a shaft, numeral wheels thereon, denominational keys, an actuator operable to impart to its respective wheel movement to register key values and movement to register a carry, said actuator including and throughout its movement constantly engaged with its respective wheel through the medium of ratchet and pawl gearing, one member of said gearing having a clutch connection with said wheel, said shaft adapted for connection with said wheel through clutch means normally disengaged, and means for moving the shaft endwise and rotatably, to respectively release and engage the clutches and to reset the wheel to zero.

38. In an adding machine, a shaft, a numeral wheel thereon, denominational keys, an actuator operable to impart to its respective wheel movement to register key values and movement to register a carry, said actuator including and throughout its movement constantly engaged with its respective wheel through the medium of ratchet and pawl gearing, one member of said gearing having a clutch connection with said wheel, including a pawl having a rigid arm, said shaft adapted for clutch connection with said wheel through said rigid arm of said pawl, and means for moving the shaft endwise and rotatably to respectively release and engage the clutches and to reset the wheel to zero.

In testimony whereof we affix our signatures in the presence of two witnesses.

GEORGE C. CHASE.
DANTE V. MAZZOCCO.

Witnesses:
M. H. ROCKWELL,
P. F. HARNETT.